United States Patent [19]
Isa et al.

[11] 3,864,369
[45] Feb. 4, 1975

[54] METHOD OF PREPARING CARBOXYLIC ACID SALTS

[75] Inventors: Hiroshi Isa, Funabashi-shi; Takeo Inagaki, Narashino-shi; Takeshi Takemoto, Ichikawa-shi; Kazuo Endoh, Tokyo, all of Japan

[73] Assignee: Lion Fat & Oil Co., Ltd., Tokyo, Japan

[22] Filed: Apr. 30, 1971

[21] Appl. No.: 138,984

[30] Foreign Application Priority Data
May 9, 1970 Japan.............................. 45-39528

[52] U.S. Cl.......... 260/413, 260/530 R, 260/531 C, 260/534 R, 260/537 R
[51] Int. Cl............................................ C08h 17/36
[58] Field of Search............. 260/413, 530 R, 531 R

[56] References Cited
UNITED STATES PATENTS

| | | | |
|---|---|---|---|
| 2,027,378 | 1/1936 | Hale................................ | 260/531 X |
| 2,930,801 | 3/1960 | Montagna et al................ | 260/530 X |
| 3,365,476 | 1/1968 | Dimond et al..................... | 260/413 |
| 3,387,029 | 6/1968 | Hartel et al...................... | 260/530 R |
| 3,449,413 | 6/1969 | Hartel et al...................... | 260/531 R |

FOREIGN PATENTS OR APPLICATIONS

1,195,754  7/1965  Germany........................... 260/530

*Primary Examiner*—Lewis Gotts
*Assistant Examiner*—Ethel G. Love
*Attorney, Agent, or Firm*—Woodhams, Blanchard and Flynn

[57] ABSTRACT

A method of preparing carboxylic acid salts which comprises subjecting to oxidative dehydrogenation alcoholic oxygen containing organic compounds by heating same with alkali metal oxides or hydroxides in the presence of a catalyst in order to produce the corresponding carboxylic acid salts, wherein said catalyst is obtained by mixing solid carbon with one or more members selected from the group consisting of metals of the Group IB, Group II and Group IV classified in the periodic Table and their inorganic compounds.

8 Claims, 3 Drawing Figures

EFFECT OF CATALYST ON REACTION RATE

EFFECT OF CATALYST ON REACTION RATE

EFFECT OF CATALYST ON REACTION RATE

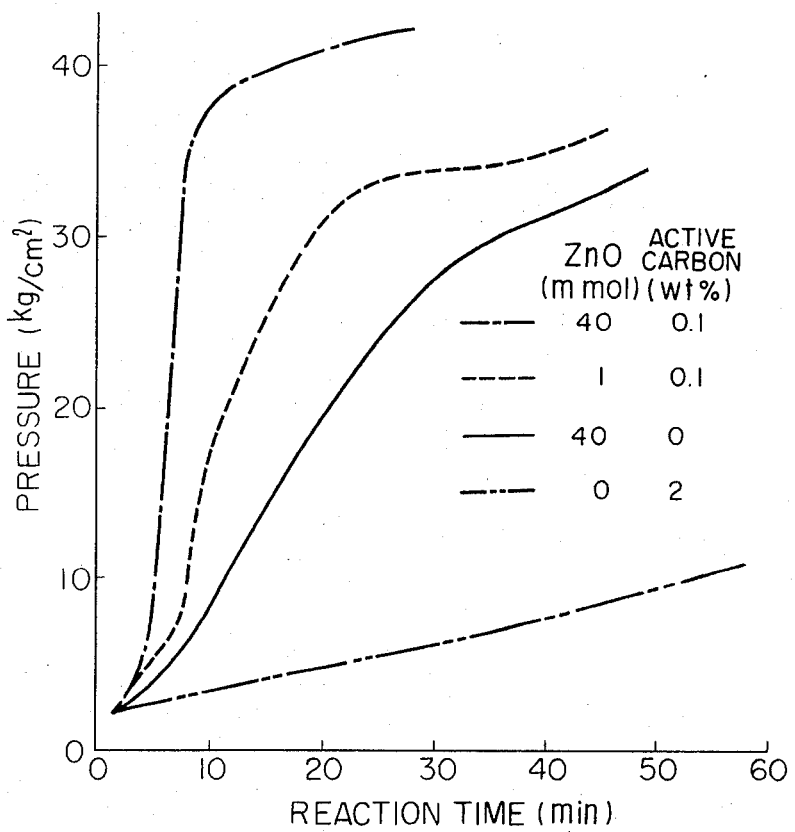

METHOD OF PREPARING CARBOXYLIC ACID SALTS

BACKGROUND OF THE INVENTION

1. Field of the Invention

The present invention relates to a method of preparing carboxylic acid salts which comprises using a mixture of a metal or its inorganic compound and solid carbon, as a catalyst, in preparing the carboxylic acid salts from the corresponding alcoholic oxygen containing compounds.

2. Description of the Prior Art

A method of preparing carboxylic acid salts by means of oxidative dehydrogenation wherein alcohol and alkali metal oxide or hydroxide are heated has been known for a long time; however, it has been difficult to carry out the method on industrial scale because the reaction rate is low and the yield is small when processed at lower temperatures and because, even when the process is conducted at a high temperature, not only does the reaction not complete but also problems are encountered such as reduced quality of the resulting carboxylic acid salts, selection of materials of the reactor to be used at a high temperature, increase of labour cost, and recovery of unreacted alcohol. Furthermore, according to the foregoing method, the materials used in the process have in most cases been limited to lower and medium alcohols. However, as higher carboxylic acid salts have been accepted favorably in the detergent industry in recent years, attempts have been made to convert higher alcohols, which are obtainable in large quantities at a moderate cost by the Ziegler process and oxo synthesis, into carboxylic acid salts. One of these attempts is to improve the alkali oxidation process as mentioned above.

For instance, according to U.S. Pat. No. 2,926,182, desired carboxylic acid salts are obtained with a comparatively high yield by subjecting higher alcohols having more than nine carbon atoms to oxidation under pressure at a high temperature. In this method, the conversion ratio (yield) of alcohol into carboxylic salts is much influenced by the reaction temperature, for example, the conversion ratio being 60% at a temperature of 324°C. and on the other hand, being 92% at a temperature of 377°C. Accordingly, the process should be conducted at a temperature above 377°C. if a better conversion ratio is desired. It is, however, said that alcohol is thermally decomposed at the temperature which deteriorates the color and smell of the products. Furthermore, the problems of the recovery of unreacted alcohol, elimination of impurities, materials of the reactor, etc. make their commercialization difficult as mentioned in the foregoing.

With the object of improving this method, U.S. Pat. No. 3,370,074 proposes to add a small amount of water to the reaction system, in which the conversion ratio is improved by the control of alcoholate which is formed according to the reaction formula of $RCH_2OH + NaOH \rightarrow RCH_2ONa + H_2O$, being achieved by the addition of water. For instance, the conversion is sharply increased to 98.5% by the addition of 5% by weight of water, based on the weight of NaOH, at a reaction temperature of about 325°C. in the case when isooctanol is used; however, even in this method those problems that arise with high temperature processes, such as the quality deterioration of the products, materials of the reactor, etc., are not avoidable. Also, the conversion ratio tends to decrease as the number of carbon atoms in the material alcohol increases. Since it is naturally desirable that the conversion rate is quantitative, the product obtained at the conversion ratio of 98.5% can not be used wholly as a base of detergent and requires processes to remove the impurities contained therein. U.S. Pat. No. 3,365,476 provides another method wherein solid carbon such as activated carbon and carbon black is used as a catalyst. According to this method, it is possible to lower the reaction temperature to about 285°C. and increase the reaction rate, thus improving the color and odor. The conversion ratio, however, is 96.5% in the case of isooctanol, which is not a satisfactory result, and the rate tends to go down when higher alcohols than isooctanol are used.

As for the catalyst to be used in the alkali oxidation process, CdO has long been known; however, the conversion ratio is very low and it is 67% in the case when caproic acid is synthesized from hexanol. The ratio is too low to arouse any consideration.

SUMMARY OF THE INVENTION

It is an object of the present invention to provide a method of preparing carboxylic acid salts by the use of a catalyst which is capable of converting the material into a carboxylic acid salt quantitatively under conditions milder than conventional ones, thus solving all the existing problems mentioned in the foregoing.

Accordingly, the present invention is specifically directed to a method for the preparation of desired carboxylic acid salts through oxidation by means of oxidative dehydrogenation of alcoholic oxygen containing organic compounds such as alcohols and the like and alkali metal oxide or hydroxide in the presence of a catalyst at a highly elevated temperature, wherein said catalyst comprises a member or two or more members selected from the group consisting of metals of the Group IB, Group II and Group IV classified in the periodic table, and their inorganic compounds such as oxides, hydroxides, sulfates, carbonates, phosphates, and nitrates.

The reaction which takes place between an alcoholic oxygen containing compound such as alcohol and alkali metal oxide or hydroxide can be expressed, for instance, by the following formula:

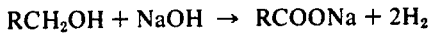

$$RCH_2OH + NaOH \rightarrow RCOONa + 2H_2$$

The quantity of an alkali metal compound to be used in the abovementioned reaction may substantially be the quantity calculated stoichiometrically which is sufficient enough to oxidize the alcoholic oxygen containing compound into a corresponding acid; however, the molar ratio of the alkali metal compound to the alcoholic oxygen containing compound can be varied within the range of 0.5 – 4:1 or more preferably within the range of 1:1 – 1.5. The reaction is usually conducted under the condition where the temperature ranges between 150°C. and 350°C. and the pressure ranges between 2 and 100 atm., wherein the temperature ranging between 230°C. and 300°C. is specifically preferable. The reaction time and temperature can be varied in consideration of the quantity of the catalyst and other conditions; however, since undesirable impurities are produced incidentally at higher temperatures, it is preferable to conduct the reaction at lower temperatures and make the catalytic contact in a shorter time, usually the temperature being 250°C. and the contact time 15 – 120 minutes. As for the percentage of the catalyst to the material alcoholic oxygen containing compound, any ratio may be acceptable but it usually ranges from 0.01 to 10% by weight and preferably from 0.2 to 4% by weight.

A catalyst to be used in the practice of the present invention is prepared by mixing solid carbon with a member or two or more members selected from the group consisting of metals classified as Group $I_B$, Group II and Group IV in the periodic table, and their inorganic compounds, and preferably the catalyst may be one of Pb, Zn, Cu, Mg, Cd, Ti, Sn, their oxides, hydroxides, and halogenides. As for solid carbon, pulverized charcoal, lamp black, and cokes may be named in addition to the aforementioned activated carbon and carbon black; however, any solid carbon may be used provided that its surface area ranges from 25 to 1,700 m²/g. The ratio of the metal or its inorganic compound to solid carbon according to this invention is not necessarily specified; however, it usually ranges between 100:1 and 1:100 and more preferably between 10:1 and 1:10.

The alcoholic oxygen containing organic compound may be a member selected from the group consisting of primary alcohols, aldehydes, aldols, esters and the mixtures thereof. These oxygen containing organic compounds can have carbon atoms ranging in number between 1 and 40 per molecule. These carbon chains may be either straight or branched chain in the structure and also can have polyfunctional groups. Among the preferable oxygen containing compounds, there are, for instance, methyl alcohol, n-propyl alcohol, isobutyl alcohol, n-decyl alcohol, lauryl alcohol, tridecyl alcohol, myristyl alcohol, cetyl alcohol, stearyl alcohol, benzyl alcohol, cynnamyl alcohol, ethylene glycol, 1,3-butanediol, glycerin, acetaldehyde, n-butyraldehyde, isovaleraldehyde, isooctylaldehyde, tridecylaldehyde, stearaldehyde, benzaldehyde, crotonaldehyde, 2,5-dipentyl-eicosanal, 4-tridecyldocosanal, 2-isopropyl-3-hydroxy-5-methyl hexanal, 1,1-didecoxydecane, ethyl acetate, methyl isovalerate, ethyl pelargonate, isopropyl stearate, tetradecylhexadecanoate, heptadecyloctadecanoate, and the like.

The alcoholic oxygen containing organic compounds which are applied to the practice of the present invention include alkanol amine, Ziegler's intermediate products, alcohols and aldehydes, which have a double bond, in addition to those organic compounds mentioned in the foregoing paragraph. When any of these materials is mixed with the alkali metal compound in the presence of the aforementioned catalyst under the conditions mentioned previously to start the reaction, the corresponding carboxylic acid salts are obtained according to the formulas mentioned below:

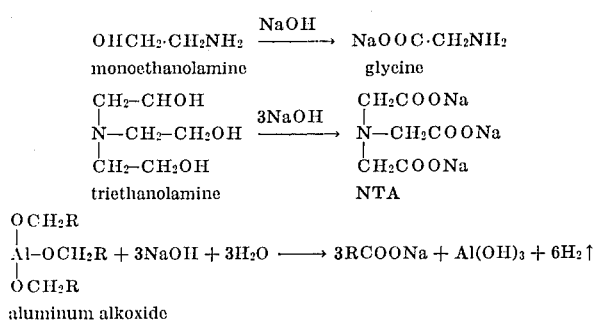

Aluminum alkoxide is an intermediate product of alcohol resulting from Ziegler process but no attempts have ever been made to synthesize carboxylic acid salt directly from it. With the use of the aforementioned catalyst, the reaction proceeds almost quantitatively. In this case, the method has the merit that aluminum can be recovered in the form of Al(OH)₃ which may be turned back to Al₂O₃, the intermediate material for the manufacture of aluminium simply by means of calcination. Though it is said in general that when the alkali oxidation process is applied to alcohols or aldehydes which have a double bond, the double bond moves to the position B and then it is cut off; however, saturated carboxylic acid salts can be obtained by the use of hydrogenation catalyst in addition to the aforementioned catalyst. For instance:

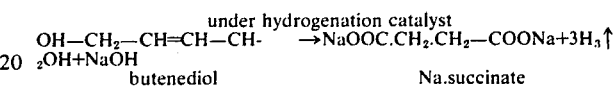

When the above reaction is conducted by the use of Raney nickel as a hydrogenation catalyst, Na·succinate can be obtained at approximately quantitative yield.

The efficacy of this catalyst can be understood from FIG. 1 which shows how fast its reaction rate is, which is approximately 25 times faster than the reaction rate effected in the absence of a catalyst or by the use of activated carbon catalyst and approximately 20 times faster than the use of CdO catalyst.

(The reaction rates shown in FIG. 1 are obtained from the increase of hydrogen pressure which is generated in the following equation:)

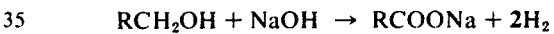

This accordingly makes it possible to conduct the reaction at lower temperatures, thus minimizing undesirable side production of impurities and improving the color and odor remarkably. FIG. 2 gives the effect obtained from various combinations of respective metals or their oxides and solid carbon and show that ZnO-activated carbon is the most effective catalyst. As for the quantity of a catalyst, 0.1% by weight of solid carbon shows enough effect if the quantity of the metal oxide is large as seen from FIG. 3. In the case where both are small in quantity (0.1 weight % of activated carbon, 0.05 weight % of ZnO), the effect somewhat decreases but still is much better than when activated carbon catalyst alone is used. The reaction product thus prepared is dissolved in water (30 – 40% aqueous solution) from which the catalyst is removed by means of filtration and is then dried to obtain the desired carboxylic acid salt. Since this is colorless, odorless, and contains only a slight amount of impurities, it can be used as a soap base of good quality without being subjected to any further processes. Furthermore, by the addition of mineral acid to this aqueous solution, carboxylic acid of good quality can be obtained therefrom. For example, when the reaction was conducted for 1-dodecanol and caustic soda mixed at a mol ratio of 1:1.3 in the presence of 0.1% activated carbon and 2% ZnO (on 1-dodecanol) at 240° – 250°C. for one hour, carboxylic acid salt obtained from the reaction product after the removal of the catalyst by means of filtration was colorless, odorless, and contained only 0.33% of unsaponified matters, of which one-tenth was unreacted doldecanol and the rest was presumably such impurities as might be attributable to the feed materials. The alkali fusion oxidizing reaction which is carried on with the use of the catalyst consisting of more than one metal or its oxide and solid carbon makes it possible to conduct the reaction quantitatively at lower temperatures, to avoid the side production of undesirable impurities and problems of color and odor, and to minimize the amount of unreacted alcohols in the product, and carboxylic acid salt of high purity is thus prepared simply by removing the catalyst from the resultant products. Furthermore, the low reaction temperature is favorable from the viewpoint of materials used for the reactor and also in the light of labor cost reduction.

Though it has not yet been clarified why the aforementioned catalyst consisting of metals or their inorganic compounds and solid carbon can be an effective catalyst for the alkali fusion oxidizing reaction; however, it is really attributable to a cooperative effect, as is seen from the fact that the catalyst thus arranged shows a remarkably improved catalytic activity as compared with either the metal oxide and solid carbon when used singly. Most probably, solid carbon serves as a sub-catalyst in the aforementioned oxidative dehydrogenation in which said metals or metal inorganic compounds are used. The reason for the colorless and odorless properties of the product may be attributed to the fact that the thermal decomposition of the reactants is avoided by lowering the reaction temperature and that, in the case where alcohol is used, synthetic alcohols are mostly used.

BRIEF DESCRIPTION OF THE DRAWING

FIG. 3 shows curves which illustrates how the composition of the catalyst exercises an effect on the catalyst action.

DESCRIPTION OF THE PREFERRED EMBODIMENTS

Example 1

Figure 1:
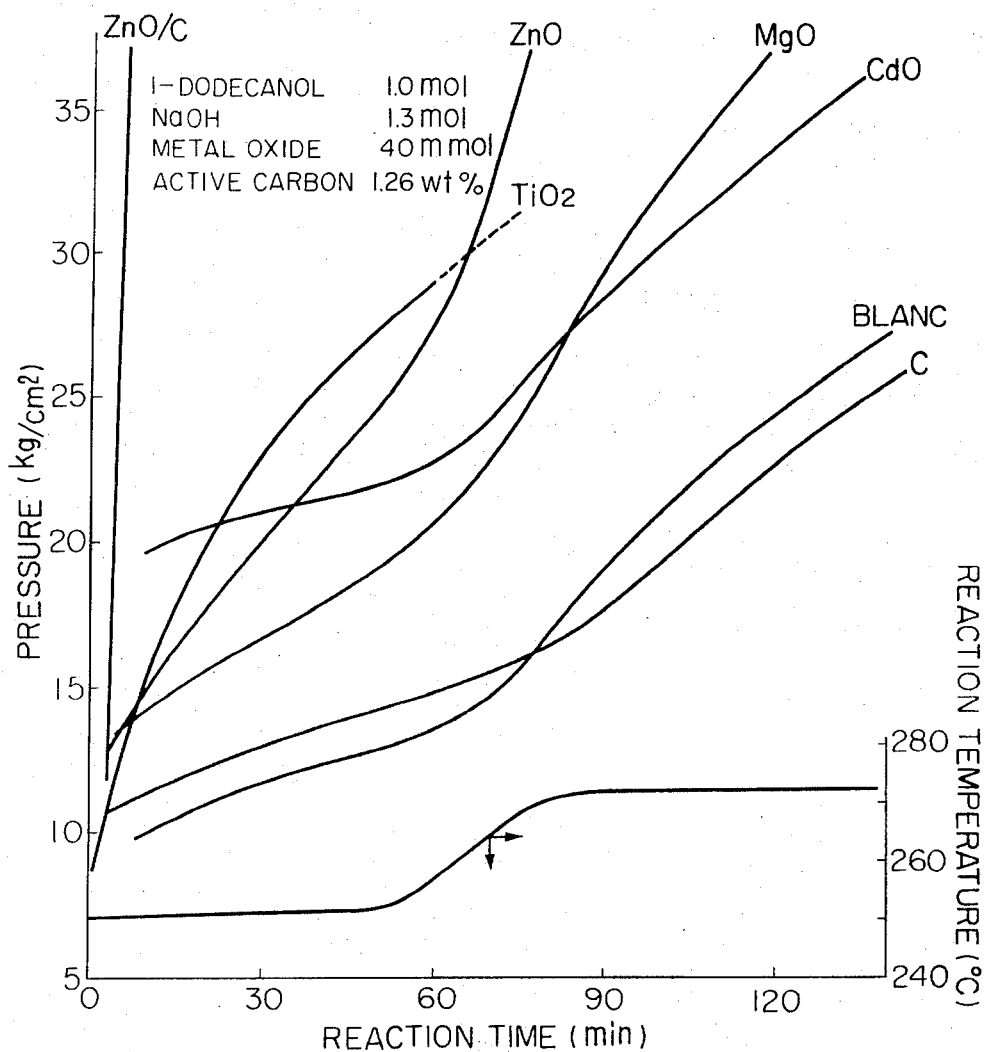
FIG. 1 and FIG. 2 show curves which indicate the effect of the catalyst.
Figure 2:
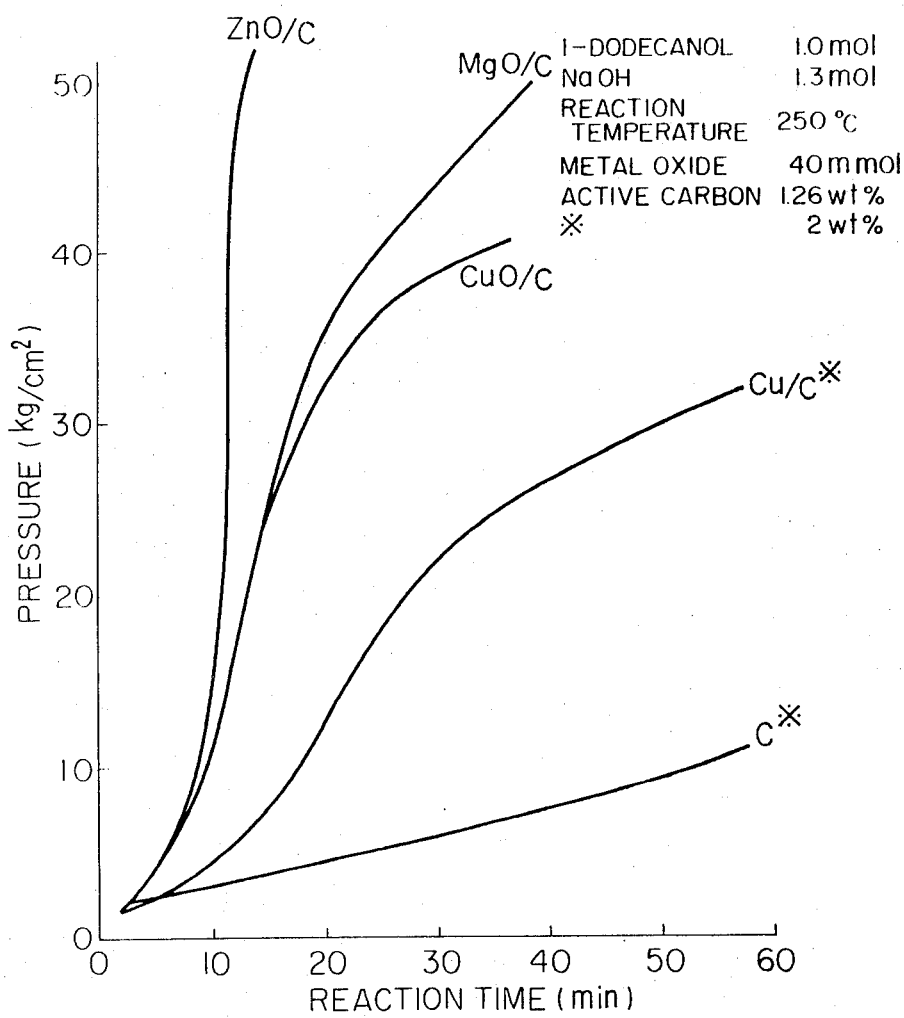

372.6 grams (2 mols) of 1-dodecanol (commercialized under the trade name of "Conol" by New Japan Chemical Co., Ltd.), 104 grams (2.6 mols) of 96% solid caustic soda, 3.8 grams of active carbon (commercialized under the trade name of "Shirasagi C" by Takeda Chemical Industries, Ltd.) and 6.6 grams of zinc oxide were charged into a two-liter autoclave equipped with an electromagnetic stirrer. The autoclave was then purged of air with nitrogen. The reaction mixture was heated to 240°–250°C. Since the pressure increased due to the evolution of hydrogen as the reaction proceeded, the reaction pressure was maintained at 20 kg/cm$^2$ by removing the generated hydrogen out of the autoclave chamber while the reaction was carried on. After a 1 hour reaction period starting from the time when the desired reaction temperature had been attained, the resultant product was cooled.

The product was then dissolved to remove the catalyst by means of filtration and was dried thereafter to obtain an anhydrous carboxylic acid salt, which was colorless and odorless and contained 0.33% of unsaponified matters, in which there was 0.03% of unreacted alcohol. The conversion of the alcohol was 100% and the yeild of soap was 99.7%. When sulfuric acid of more than equivalent was put in this aqueous solution, a carboxylic acid was obtained at an approximately quantitative yield.

Example 2

Example 1 was repeated except the use of 372 grams (2 mols) of $C_{12}$ alcohol obtained by Ziegler process (commercialized under the trade name "Alfol-12" by Continental Oil Co.), 104 grams (2.6 mols) of 96% solid caustic soda, 7.4 grams of active carbon and 6.6 grams of zinc oxide.

The carboxylic acid salt thus obtained was colorless and odorless. The unsaponified matters contained therein was 0.26% and the alcohol conversion was 99.7%.

Example 3

Example 1 was repeated except the use of 382 grams (2 mols) of $C_{12} - C_{13}$ oxo alcohol (commercialized under the trade name "Dobanol" by Shell Chemicals Co.), 104 grams (2.6 mols) of 96% pulverized solid caustic soda, 7.4 grams of active carbon and 6.6 grams of zinc oxide.

The carboxylic acid salt thus obtained was colorless and odorless, containing 0.18% of unsaponified matters. The alcohol conversion was 99.8%.

Example 4

Example 1 was repeated except the use of 904 grams (2 mols) of tetradecyl hexadecanoate, 208 grams (5.2 mols) of solid caustic soda, 7.4 grams of active carbon and 6.6 grams of zinc oxide. The carboxylic acid salt thus obtained was colorless and odorless and contained 0.31% of unsaponified matters. The conversion ratio of the tetradecyl hexadecanoate was 99.6 %.

Example 5

Example 1 was repeated except the use of 908 grams (2 mols) of 1,1-di-deconoxydecane, 312 grams (7.8 mols) of 90% solid caustic soda, 36 grams of water, 7.4 grams of active carbon and 6.6 grams of zinc oxide, and the reaction temperature was 220°-230°C. The reaction time was 4 hours. The carboxylic acid salt thus obtained contained 1.0% of unsaponified matters. The conversion of 1,1-di-deconoxydecane was 98.8%.

Example 6

Example 1 was repeated except that the reaction mixture consisting of 236 grams (2 mols) of isooctylaldehyde, 104 grams (2.6 mols) of 96% solid caustic soda, 7.4 grams of active carbon and 6.6 grams of zinc oxide was used and the reaction temperature was between 220°C. and 230°C. The carboxylic acid salt thus obtained contained 0.52% of unsaponified matters. The conversion of isooctylaldehyde was 99.3%.

Example 7

Example 1 was repeated except the use of 372.6 grams (2 mols) of 1-dodecanol, 162 grams (2.6 mols) of 90% solid caustic potash, 7.4 grams of active carbon and 6.6 grams of zinc oxide. The carboxylic acid potassium salt thus obtained was colorless and odorless and contained 0.30% of unsaponified matters. The alcohol conversion was 100% and the yield of the potassium salt was 99.7%.

Example 8

Example 1 was repeated except the use of the mixture of 372.6 gr (2 mols) of 1-dodecanol, 104 grams (2.6 mols) of 96% solid caustic soda, 7.4 grams of active carbon and 10.8 grams of stannous oxide, and the reaction period was 2 hours. The carboxylic acid salt thus obtained was colorless and odorless. In contained 0.91% of unsaponified matters and the conversion of the alcohol was 99.2%. The yield of the soap was 98.9%.

Example 9

Example 1 was repeated except the use of 372.6 grams (2 mols) of 1-dodecanol, 104 grams (2.6 mols) of 96% solid caustic soda, 7.4 grams of active carbon and 6.4 grams of titanium dioxide, and the reaction time was 2 hours. The carboxylic acid salt thus obtained was colorless and odorless. The content of unsaponified matters was 0.38%, the conversion ratio of the alcohol was 99.9%, and the yield of the soap was 99.6%.

Example 10

Example 1 was repeated except the use of 372.6 grams (2 mols) of 1-dodecanol, 104 grams (2.6 mols) of 96% solid caustic soda, 7.4 grams of active carbon and 80 grams of zinc hydroxide. The carboxylic acid salt thus obtained was colorless and odorless, and contained 0.32% unsaponfied matters. The alcohol conversion was 100% and the soap yield was 99.7%.

Example 11

Example 1 was repeated except the reaction mixture of 372.6 grams (2 mols) of 1-dodecanol, 104 grams (2.6 mols) of 96% solid caustic soda, 7.4 grams of active carbon and 10.8 grams of zinc chloride was used. The carboxylic acid salt thus prepared was colorless and odorless, and contained 0.50% of unsaponfied matters. The conversion of the alcohol was 99.8% and the yield of the soap was 99.5%.

Example for comparison

Example 1 was repeated except the use of 372.0 grams (2 mols) of 1-dodecanol, 104 grams (2.6 mols) of 96% solid caustic soda and 7.4 grams of active carbon.

It was observed that the reaction product thus prepared contained 50% of unreacted 1-dodecanol. The conversion of the dodecanol was 37%.

Thus having described the invention, we claim:

1. A process for preparing carboxylic acid salt from alcoholic oxygen-containing organic reactant selected from the group consisting of primary alcohols, aldehydes, aldols, esters, alkanolamines and aluminum alcoholates, comprising reacting said alcoholic oxygen-containing organic reactant with an alkali metal compound selected from the group consisting of alkali metal oxides and hydroxides, under oxidative dehydrogenation conditions of a temperature in the range of 150° to 350°C and a pressure in the range of 2 to 100 atmospheres, in the presence of from 0.01 to 10% by weight, based on the weight of said alcoholic oxygen-containing reactant, of catalyst consisting essentially of a mixture of (a) at least one member selected from the group consisting of zinc, copper, the oxides of metals of Group IB, Group II and Group IV of the Periodic Table, zinc chloride and zinc hydroxide, and (b) solid carbon having a surface area in the range of from 25 to 1,700 m$^2$/g, the weight ratio of (a):(b) being in the range of about 100:1 to 1:100.

2. The process of claim 1, wherein the amount of said catalyst is in the range of 0.2 - 4 wt.%, based on the weight of the alcoholic oxygen containing reactant.

3. The process of claim 1, wherein said weight ratio of (a):(b) is within the range between 10:1 and 1:10.

4. The process of claim 1, wherein said catalyst is selected from the group consisting of the oxides of Pb, Zn, Cu, Mg, Cd, Ti, and SN.

5. The process of claim 1, wherein said catalyst member is selected from the group consisting of Zn, and the oxide and hydroxide thereof.

6. The process of claim 1, wherein said primary alcohols and aldehydes have 1 - 40 carbon atoms, respectively.

7. The process of claim 1, wherein said oxidative dehydrogenation is conducted at a temperature between 230°C. and 300°C.

8. A process according to claim 1, wherein the ingredients of the reaction system consist essentially of said organic reactant, said alkali metal compound in a substantially anhydrous state and said catalyst.

* * * * *